United States Patent
Jassal

(10) Patent No.: US 12,312,033 B2
(45) Date of Patent: May 27, 2025

(54) BICYCLE STABILIZATION SYSTEM

(71) Applicant: Devpreet Jassal, Selkirk (CA)

(72) Inventor: Devpreet Jassal, Selkirk (CA)

( * ) Notice: Subject to any disclaimer, the term of this patent is extended or adjusted under 35 U.S.C. 154(b) by 755 days.

(21) Appl. No.: 17/687,341

(22) Filed: Mar. 4, 2022

(65) Prior Publication Data
US 2022/0379986 A1 Dec. 1, 2022

Related U.S. Application Data

(60) Provisional application No. 63/195,386, filed on Jun. 1, 2021.

(51) Int. Cl.
*B62H 7/00* (2006.01)

(52) U.S. Cl.
CPC ..................... *B62H 7/00* (2013.01)

(58) Field of Classification Search
CPC ... B62H 7/00; B62H 1/10; B62H 1/12; B62K 5/10
See application file for complete search history.

(56) References Cited

U.S. PATENT DOCUMENTS

| | | | | |
|---|---|---|---|---|
| 1,820,189 A | * | 8/1931 | Hess | B62K 13/00 280/293 |
| 1,921,029 A | * | 8/1933 | Hess | B62H 1/12 280/293 |
| 2,220,528 A | * | 11/1940 | Kutil | B62H 1/12 280/301 |
| 3,437,352 A | * | 4/1969 | Longo | B62H 7/00 280/293 |
| 4,351,410 A | * | 9/1982 | Townsend | B62D 61/065 280/5.509 |
| 5,064,213 A | * | 11/1991 | Storch | B62H 1/12 280/301 |
| 5,100,163 A | * | 3/1992 | Egley | B62H 1/12 280/301 |
| 5,352,403 A | * | 10/1994 | Egley | B62H 1/12 280/301 |
| 6,318,745 B1 | * | 11/2001 | Sharp, III | B62H 1/12 280/301 |

(Continued)

FOREIGN PATENT DOCUMENTS

| | | |
|---|---|---|
| DE | 4035128 A1 | 6/1992 |
| JP | 4587335 B2 | 11/2010 |
| JP | 3183383 U | 5/2013 |

OTHER PUBLICATIONS

International Search Report, PCT/IB2022/054770 dated Aug. 10, 2022, 9 pages.

(Continued)

*Primary Examiner* — Anne Marie M Boehler
*Assistant Examiner* — Michael R Stabley
(74) *Attorney, Agent, or Firm* — McAndrews, Held & Malloy, Ltd.

(57) ABSTRACT

A stabilization system for maintaining a two-wheeled vehicle, such as a bicycle, in an upright position is disclosed. The stabilization system includes a wheeled frame that can be coupled to the main body of the two-wheeled vehicle. The wheeled frame includes a horizontal balancing arm that extends outwardly from the bicycle body, and shock absorbers that act to maintain the bicycle in an upright position when the bicycle is not in motion.

17 Claims, 6 Drawing Sheets

(56) References Cited

U.S. PATENT DOCUMENTS

| | | | | |
|---|---|---|---|---|
| 6,367,824 B1* | 4/2002 | Hayashi | ............ | B62K 15/00 |
| | | | | 280/282 |
| 6,817,617 B2* | 11/2004 | Hayashi | ............ | B62K 5/05 |
| | | | | 280/5.509 |
| 6,994,368 B2* | 2/2006 | Brown | ............ | B62H 1/12 |
| | | | | 280/288.4 |
| 7,287,774 B2* | 10/2007 | Mullins | ............ | B62H 1/12 |
| | | | | 180/219 |
| 7,543,829 B1* | 6/2009 | Barnes | ............ | B62K 5/02 |
| | | | | 280/282 |
| 7,641,213 B1* | 1/2010 | Chen | ............ | B62H 1/12 |
| | | | | 280/301 |
| 7,708,291 B1* | 5/2010 | Henderson | ............ | B62K 5/10 |
| | | | | 280/771 |
| 7,798,512 B2* | 9/2010 | Kanou | ............ | B62K 5/10 |
| | | | | 280/293 |
| 8,016,302 B1* | 9/2011 | Reeve | ............ | B62K 5/08 |
| | | | | 280/5.509 |
| 8,376,384 B2* | 2/2013 | Tsai | ............ | B62H 1/12 |
| | | | | 280/301 |
| 9,067,633 B2* | 6/2015 | Bell | ............ | B62B 9/26 |
| 9,771,029 B2* | 9/2017 | Lytle | ............ | B62H 7/00 |
| 10,577,039 B2* | 3/2020 | Khouri | ............ | B62H 1/12 |
| 11,465,701 B2* | 10/2022 | Soza | ............ | B62H 1/12 |
| 2020/0164938 A1* | 5/2020 | Buchwald | ............ | B62H 1/12 |

OTHER PUBLICATIONS

International Preliminary Report on Patentability, PCT/IB2022/054770, dated Dec. 14, 2023, 7 pages.

* cited by examiner

BICYCLE STABILIZATION SYSTEM

FIELD OF THE INVENTION

The present technology relates to a stabilization system for a bicycle or other two-wheeled vehicles. More particularly, the present technology relates to a stabilization system that maintains the bicycle in an upright position when the bicycle is not in motion.

BACKGROUND

The bicycle as a vehicle is getting more popular as a mode of transportation. When the bicycle is in motion, the bicycle stays in an upright position due to rotational centrifugal force. When the bicycle stops, the rotational centrifugal force disappears and the bicycle becomes unstable. There are many attempts to make the bicycle stable when it is not moving. However, it would be useful to have a system that can keep the bicycle stable when not in motion, particularly when a rider is seated on the bicycle. It would also be beneficial if the system could allow the bicycle to be enclosable for all weather riding.

SUMMARY OF THE INVENTION

The present technology is directed to a stabilization system for a two-wheeled vehicle, such as a bicycle, that includes shock absorbers that act to maintain the bicycle in an upright position when the bicycle is not in motion. In one aspect, the present technology is directed to a bicycle stabilization system that comprises: (a) first and second wheels configured for positioning one on each side of the bicycle adjacent to the rear bicycle wheel; (b) first and second horizontal members each having a first end and a second end, wherein the first end of the first horizontal member is configured to couple to an axle of the first wheel, and the first end of the second horizontal member is configured to couple to an axle of the second wheel; (c) first and second vertical members each having an upper end and a lower end, wherein the lower end of the first vertical member is coupled to the first horizontal member at its second end thereof, and the lower end of the second vertical member is coupled to the second horizontal member at its second end thereof; (d) a horizontal balancing arm configured for rotatably mounting to the main bicycle body so that the balancing arm is perpendicular to the main bicycle body when in an upright position; the horizontal balancing arm having a first end rotatably coupled to the upper end of the first vertical member, and having a second end rotatably coupled to the upper end of the second vertical member; (e) first and second shock absorber arms each having a first end and a second end, wherein the first end of the first shock absorber arm is slidably mounted to the first vertical member and the first end of the second shock absorber arm is slidably mounted to the second vertical member, and the second ends of the first and second shock absorber arms are configured for coupling to the main bicycle body. The shock absorbers can be coil or spring-loaded shock absorbers, or alternatively, can be hybrid shock absorbers that employ a combination of springs, magnets, gas, oil, etc.

In alternative embodiments, the stabilization system can include one or more additional spring coils/shock absorbers positioned on each of the first and second vertical members.

BRIEF DESCRIPTION OF THE DRAWINGS

The figures are not necessarily to scale. Where appropriate, similar or identical reference numbers are used to identify similar or identical components.

DETAILED DESCRIPTION OF THE INVENTION

As used herein, the terms "upper", "lower", "front", "rear", "horizontal", "vertical", "right" and "left" relate to the claimed subject matter as oriented in each figure.

As used herein, the term "proximal" refers to a direction toward the front of the bicycle, and the term "distal" refers to a direction toward the rear of the bicycle.

Figure 1:
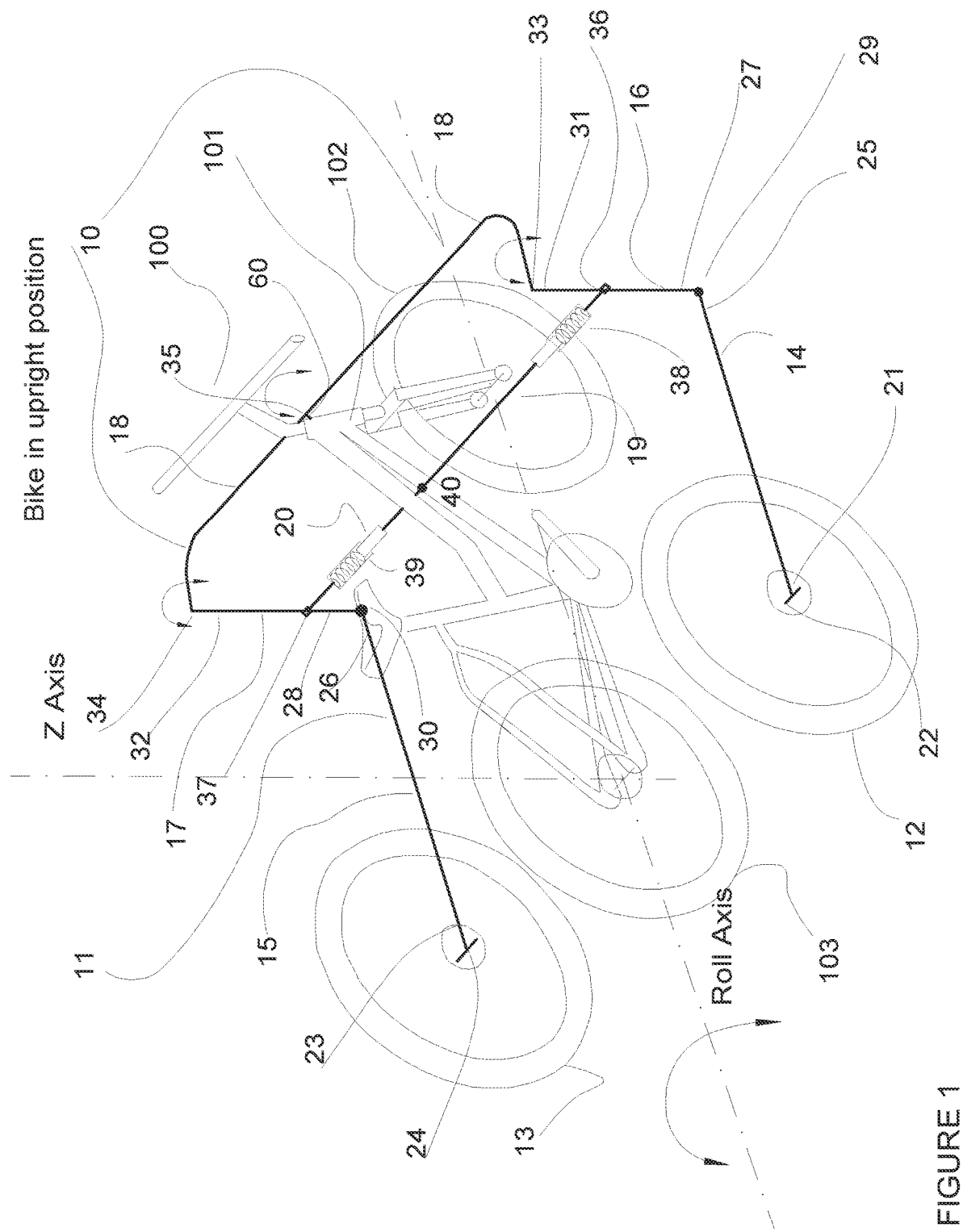
FIG. 1 is a perspective view of a stabilization system for a bicycle.
Figure 2:
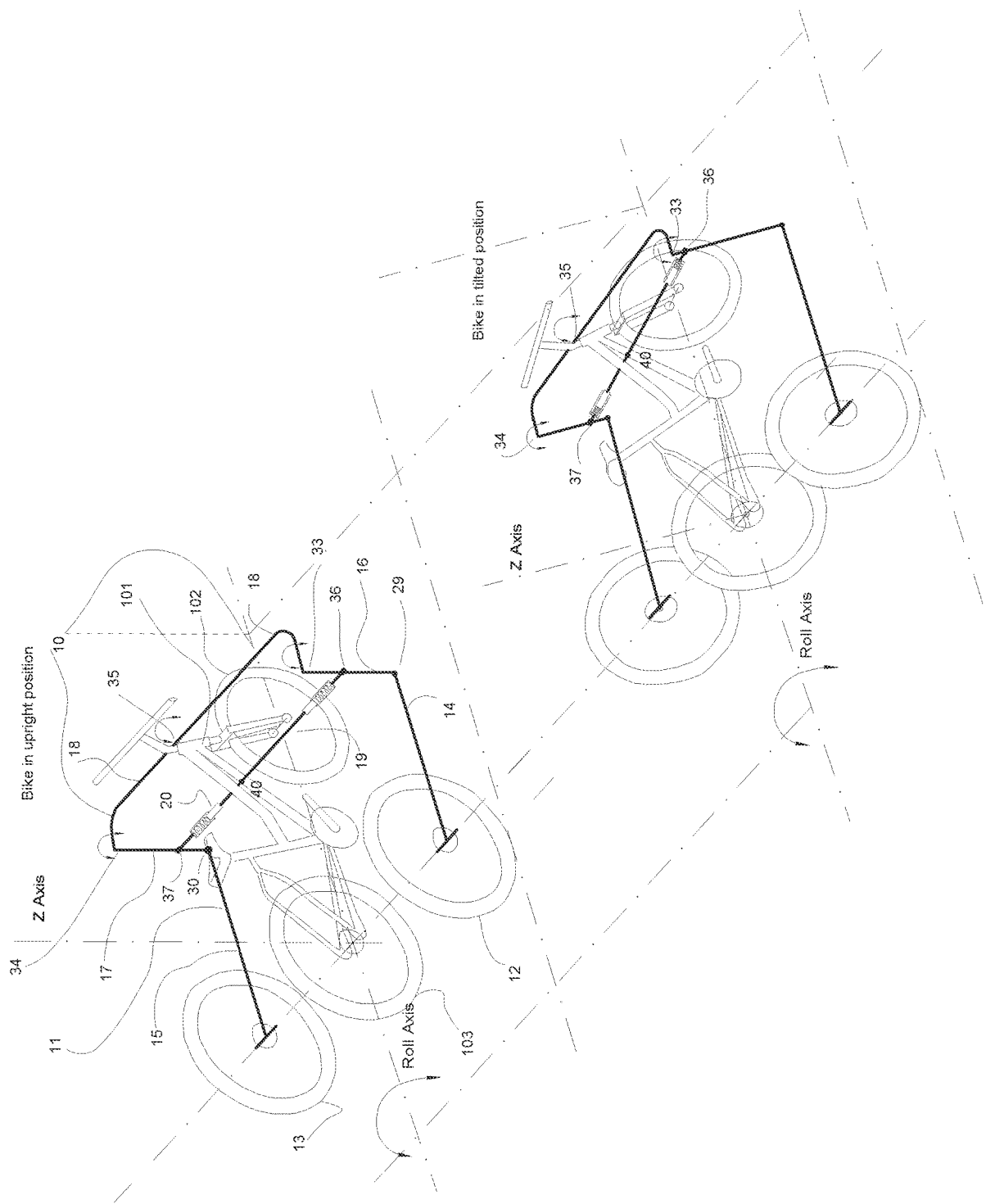
FIG. 2 is a perspective view of the stabilization system showing the stabilization system when the bicycle is in upright and tilted positions.
Figure 3:
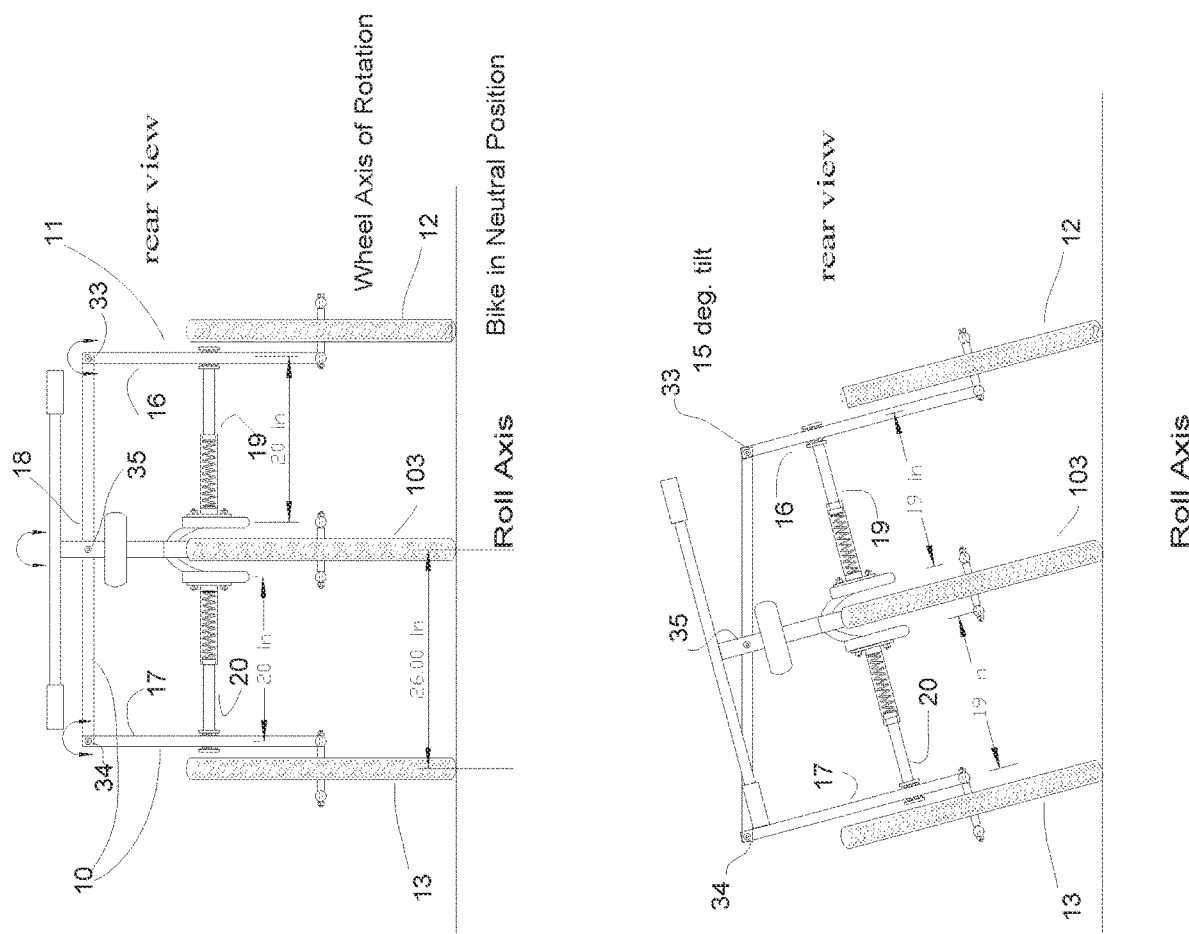
FIG. 3 is a rear view of the stabilization system showing the stabilization system when the bicycle is upright and tilted positions.

A system for stabilizing a bicycle is described generally with reference to FIGS. 1-3. Referring to FIG. 1, a bicycle stabilization system 10 is shown mounted on a bicycle 100. The bicycle 100 includes a main bicycle body 101, and front and rear wheels 102 and 103 driven by pedals. In some embodiments, the bicycle can be motorized.

The bicycle stabilization system 10 includes a frame 11 supported by first and second wheels 12 and 13, respectively, that are positioned one on each side of the bicycle body and running parallel thereto. The first and second wheels are shown adjacent to the rear wheel 103 of the bicycle 100, but could be positioned at any suitable location along the main bicycle body. The frame of the stabilization system is configured for coupling to the bicycle and comprises first and second horizontal members 14 and 15, first and second vertical members 16 and 17, a horizontal balancing arm 18, and first and second shock absorber arms 19 and 20.

The first and second horizontal members 14 and 15 are positioned one on each side of the bicycle and are parallel to the ground along the main bicycle body. The first horizontal member 14 has a first end 21 that is configured for coupling to the axle 22 of the first wheel 12, and the second horizontal member has a first end 23 that is configured for coupling to the axle 24 of the second wheel 13. Any suitable connector can be used to couple the first ends of the horizontal members 21 and 23 to their respective wheel axles.

The first and second horizontal members each have a second end 25 and 26, respectively. The second end 25 of the first horizontal member 14 is coupled to a lower end 27 of the first vertical member 16 via a joint 29, and the second end 26 of the second horizontal member 15 is coupled to a lower end 28 of the second vertical member 17 via a joint 30. The coupling can be a fixed or welded joint, or other suitable mechanism for joining the horizontal member to its respective vertical member. The vertical members 16 and 17 run vertical relative to the ground when the bicycle is in an upright position, and each has an upper end 31 and 32, respectively, that may extend higher than the front wheel of the bicycle when the stabilization system is attached to the bicycle.

The horizontal balancing arm 18 has a first end rotatably attached via a rotational joint 33 to the upper end 31 of the first vertical member 16, and a second end rotatably attached via a rotational joint 34 to the upper end 32 of the second vertical member 17. The balancing arm 18 also has a rotational joint 35 attached at the mid-point of the balancing arm for attaching the stabilization system to the main bicycle body. In FIG. 1, the balancing arm is shown mounted to the bicycle body 101 via a rod 60, which has one end rigidly attached to the bicycle body, and the other end joined to the rotational joint 35. The handle bar stem passes through the body of the bicycle to attach to the front wheel for maneuvering. It should be appreciated that the balancing arm 18 could be mounted at other locations, such as behind the rider's seat, or other suitable locations on the main bicycle body (See FIG. 6). The rotational joints 33, 34, and 35 are two-dimensional rotation joints that are oriented so that their respective axes of rotation run in the same direction. This allows the balancing arm 18 to rotate around a single axis when the bicycle is tilted in either direction (to the right or left), as shown in FIGS. 2 and 3.

The stabilization system further includes first and second shock absorber arms 19 and 20, each having a linear joint 36 and 37 respectively, at one end thereof that connects to a respective one of the first and second vertical members 16 and 17. The linear joints 36 and 37 slide vertically up or down along their respective vertical member 16 and 17 only in one dimension. Each shock absorber arm 19 and 20 has an opposite end configured for rigid coupling 40 to the bicycle body. The first and second shock absorber arms 19 and 20 are each equipped with a shock absorber 38, 39, respectively. In one embodiment, the shock absorbers 38 and 39 are spring coil or spring-loaded shock absorbers. When the bicycle tilts or is tilted by the rider the linear joints 36 and 37 slide upwards or downwards depending on whether the bicycle is tilted to the left or right. Sliding of the linear joints 36 and 37 along their respective vertical members 16 and 17 compresses the spring coils of the shock absorbers 38 and 39, as shown in FIG. 2 and FIG. 3. As an example, FIG. 3 illustrates the position of the stabilization system when the bicycle is tilted at a 15 degree angle from its upright position. The compressed spring coils impart pressure to recoil back and bring the bicycle into an upright position, as shown in FIG. 2 and FIG. 3. When the bicycle is in an upright position, the shock absorbers 38 and 39 are horizontal to the ground and in fully elongated position. In alternative embodiments, instead of a simple spring coil shock absorber, the shock absorbers could be hybrid shock absorbers that employ a combination of springs, magnets, gas, oil, etc.

Figure 4:
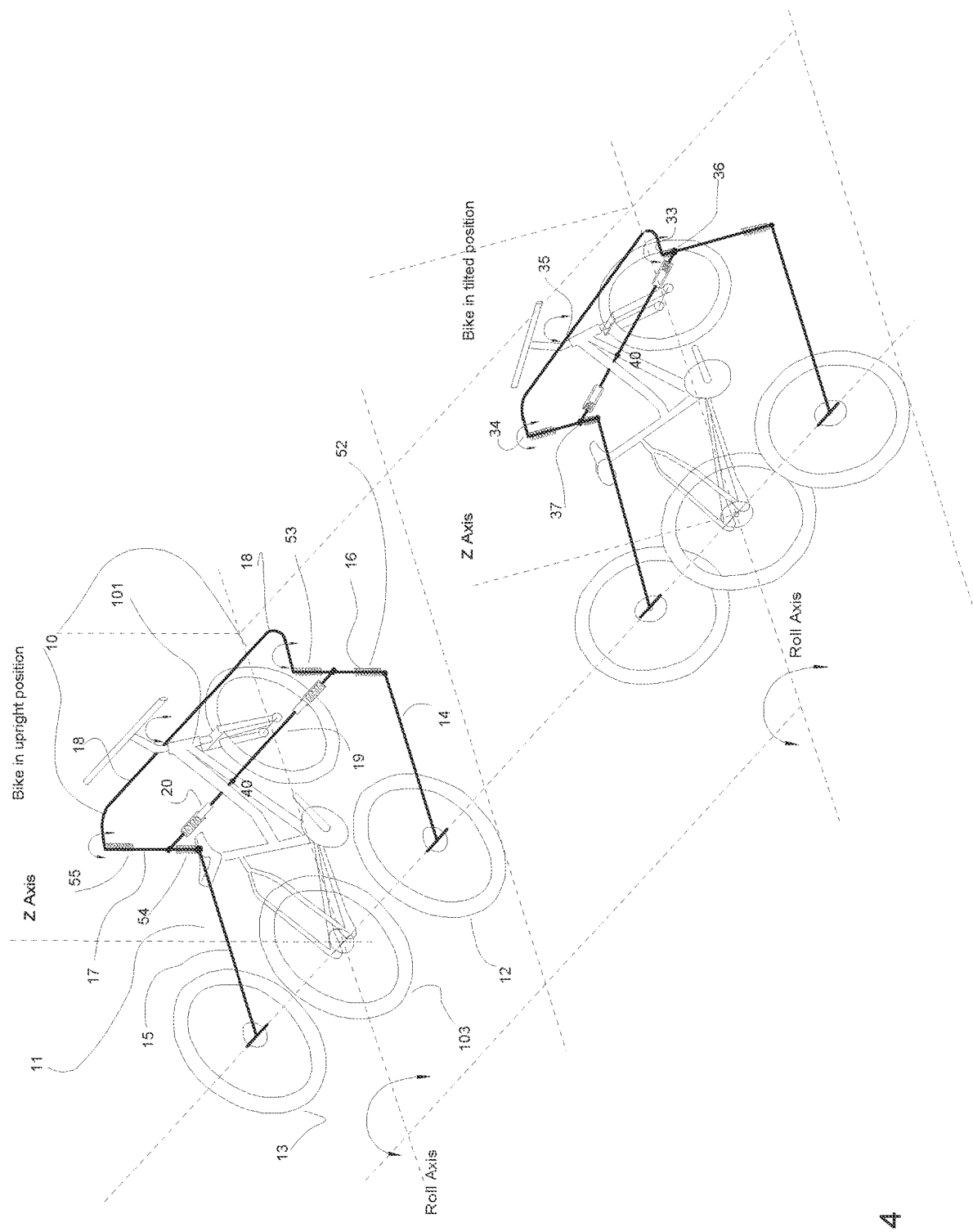
FIG. 4 is a perspective view of another alternative embodiment of the stabilization system showing the stabilization system when the bicycle is in upright and tilted positions.

With reference to FIG. 4, an alternative embodiment of the stabilization system is shown. Aspects of different embodiments of the stabilization system can be identical to those described above and shown in FIGS. 1-3. Those features are assigned reference numbers identical to those shown in FIGS. 1-3. Features that are present in the alternative embodiments but differ in some aspect to those shown in FIGS. 1-3 are assigned the same numeric identifier but with an added letter. New features are assigned unique reference numbers.

In the alternative embodiment shown in FIG. 4, one or more additional spring coils/shock absorbers may be added to each of the first and second vertical members 16 and 17 to provide additional recoil support to the linear joints 36 and 37. In this embodiment, first vertical member 16 has an additional coil spring/shock absorber 52 positioned at its lower end and an additional coil spring/shock absorber 53 positioned at its upper end, and second vertical member 17 has additional coil spring/shock absorbers 54 and 55 positioned at its lower end and upper end, respectively. The additional shock absorbers 52, 53, 54, and 55 can be coiled spring shock absorbers or alternatively, hydraulic, pneumatic or magnetic shock absorbers, or a hybrid combination thereof.

Figure 5:
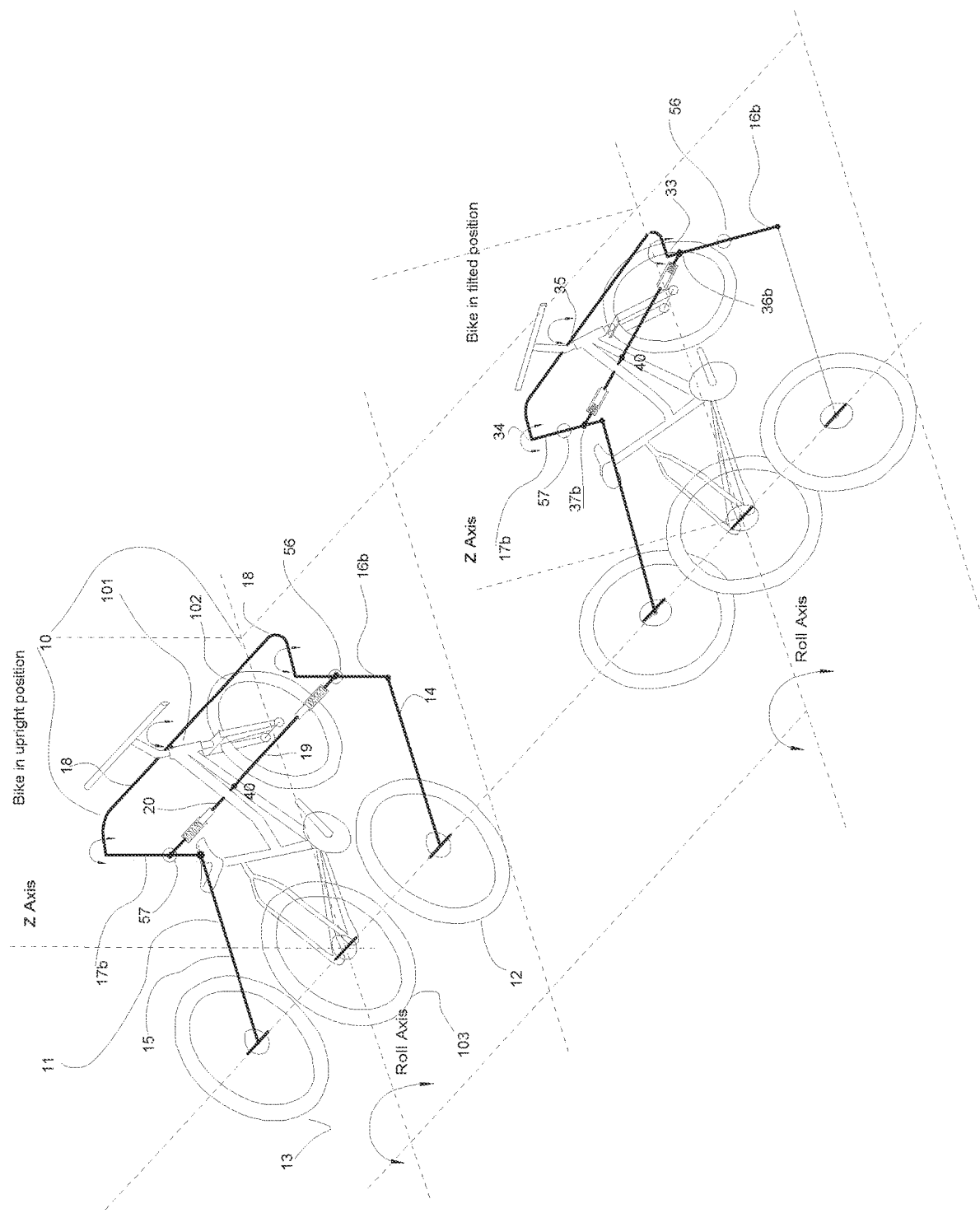
FIG. 5 is a perspective view of another alternative embodiment of the stabilization system showing the stabilization system when the bicycle is in upright and tilted positions.

Referring now to FIG. 5, in some embodiments, magnetic coils or magnetic stops 56 and 57 may be positioned at the midpoint of the vertical members 16b and 17b, respectively, to help maintain the bicycle in the upright position. In this embodiment, the linear joints 36b and 37b, connected to the vertical members 16b and 17b, respectively, are made of a metal, such as steel, that is attracted to the magnetic stops. The linear joint 36b is drawn to the magnetic stop 56, and the linear joint 37b is drawn to the magnetic stop 57, which helps to keep the shock absorber arms 19 and 20 horizontal to the ground and the bicycle stabilized in the upright position. When the bicycle is tilted to the right or left, the linear joints 36b and 37b slide along the vertical members 16b and 17b, as shown in FIG. 5. The magnetic attraction of the linear joints to the magnetic stops helps to bring the linear joints back to the midpoint of the vertical members, thereby assisting in returning the bicycle to its upright position.

The length of the horizontal members 14 and 15, the length (or height) of the vertical members 16 and 17, and the length of the horizontal balancing arm 18 can vary depending on the size of the bicycle, and the size and style of the bicycle frame. The relative positions of the horizontal members, the vertical members, and the horizontal balancing arm can also be adjusted to change the position and height relative to the wheels 12 and 13.

Figure 6:
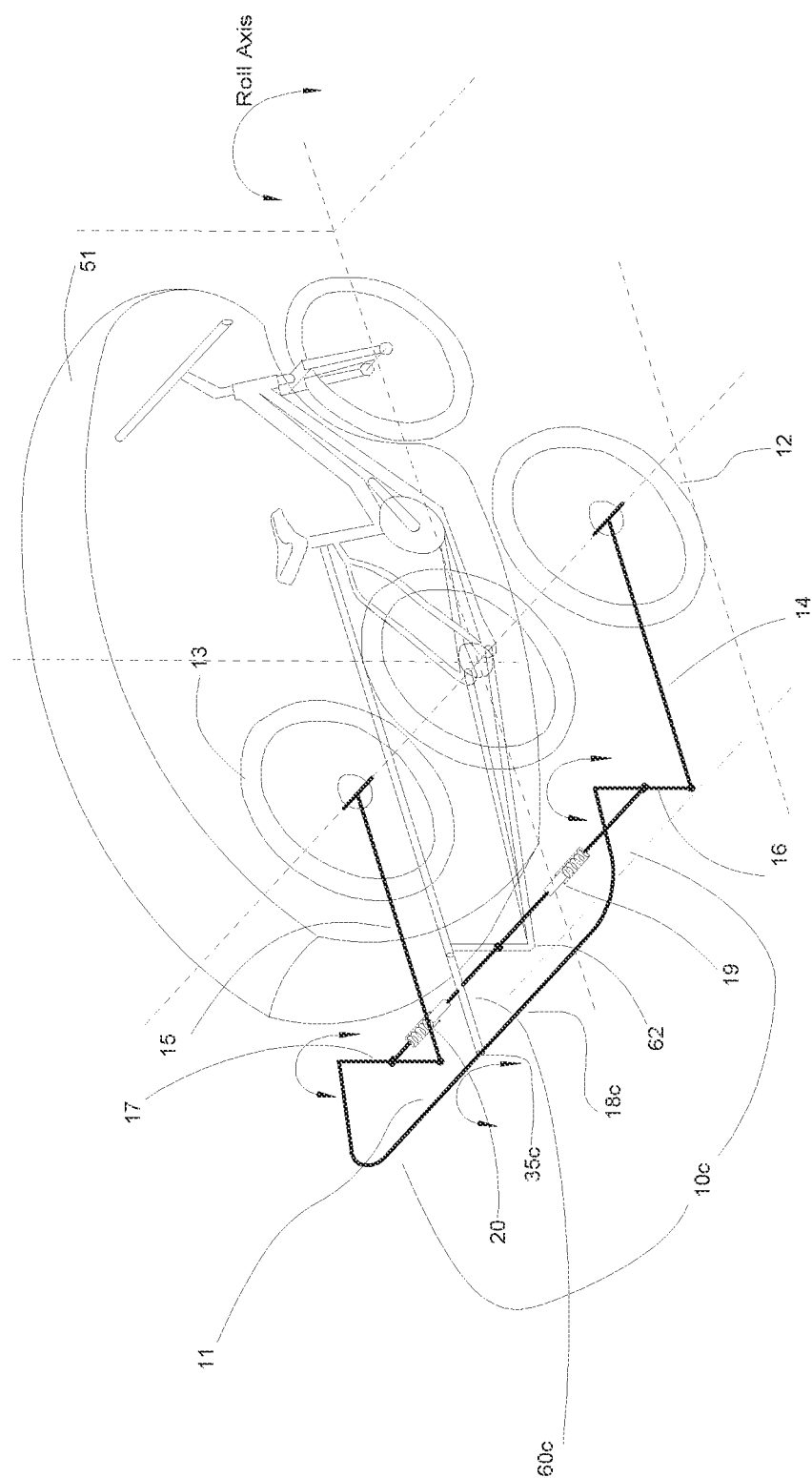
FIG. 6 is a perspective view of an alternative embodiment of the stabilization system permitting the bicycle to be enclosed.

Referring now to FIG. 6, an alternative embodiment of the bicycle stabilization system is shown in which a stabilization system 10c is mounted at the rear of the bicycle. In this embodiment, a rod 60c has a proximal end rigidly attached to the seat post of the bicycle body, and a distal end that extends rearwardly with respect to the bicycle. A rotational joint 35c attached at the midpoint of a horizontal balancing arm 18c is joined to the distal end of the rod 60c for mounting the stabilization system to the bicycle. A support rod 62 also extends rearwardly with respect to the bicycle and has a proximal end coupled to the axle of the rear bicycle wheel. A distal portion of the support rod 62 is joined to the rod 60c to support the rod 60c and keep it rigid.

Since the stabilization system keeps the bicycle in an upright position when not in motion, a rider does not need to have either or both feet on the ground to keep the bicycle upright. This allows a bicycle to be at least partially enclosed by a cover or enclosure 51, as shown in FIG. 6. The enclosure protects the rider from inclement weather, thereby permitting all weather riding. The cover can be made of flexible or rigid material, and can completely or partially enclose the bicycle.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims.

What is claimed is:

1. A bicycle balancing system adapted to be attached to a bicycle having front and rear wheels and a main bicycle body, the balancing system comprising:
   (a) first and second wheels configured for positioning one on each side of the bicycle adjacent to the rear wheel;
   (b) first and second horizontal members each having a first end and a second end, wherein the first end of the first horizontal member is configured to couple to an axle of the first wheel, and the first end of the second horizontal member is configured to couple to an axle of the second wheel;
   (c) first and second vertical members each having an upper end and a lower end, wherein the lower end of the first vertical member is coupled to the first horizontal member at the second end thereof, and the lower end of the second vertical member is coupled to the second horizontal member at the second end thereof;
   (d) a horizontal balancing arm configured for rotatably mounting to the main bicycle body so that the balancing arm is perpendicular to the main bicycle body when in an upright position; the horizontal balancing arm having a first end rotatably coupled to the upper end of the first vertical member, and having a second end rotatably coupled to the upper end of the second vertical member;
   (e) first and second shock absorber arms each having a first end and a second end, wherein the first end of the first shock absorber arm is slidably mounted to the first vertical member and the first end of the second shock absorber arm is slidably mounted to the second vertical member, and the second ends of the first and second shock absorber arms are configured for coupling to the main bicycle body.

2. The bicycle balancing system of claim 1, wherein the horizontal balancing arm includes a rotational joint for rotatably mounting the horizontal balancing arm to the main bicycle body.

3. The bicycle balancing system of claim 1, wherein the first end of the horizontal balancing arm includes a rotational joint for rotatably coupling the first end of the horizontal balancing arm to the first vertical member; and the second end of the horizontal balancing arm includes a rotational joint for rotatably coupling the second end of the horizontal balancing arm to the second vertical member.

4. The bicycle balancing system of claim 1, wherein the first vertical member includes a linear joint for slidably mounting the first shock absorber arm to the first vertical member; and the second vertical member includes a linear joint for slidably mounting the second shock absorber arm to the second vertical member.

5. The bicycle balancing system of claim 4, wherein the first and second vertical members each include at least one shock absorber.

6. The bicycle balancing system of claim 5, wherein the first and second vertical members each have a shock absorber positioned at the upper end of the vertical member and at the lower end of the vertical member.

7. The bicycle balancing system of claim 6, wherein the shock absorbers are spring-loaded shock absorbers or hybrid shock absorbers.

8. The bicycle balancing system of claim 5, wherein the shock absorbers of the first and second vertical members are spring-loaded shock absorbers.

9. The bicycle balancing system of claim 5, wherein the shock absorbers of the first and second vertical members are hybrid shock absorbers.

10. The bicycle balancing system of claim 1, wherein the first and second horizontal members each have a length that is adjustable.

11. The bicycle balancing system of claim 1, wherein the first and second vertical members each have a height that is adjustable.

12. The bicycle balancing system of claim 1, wherein the horizontal balancing arm has a length that is adjustable.

13. The bicycle balancing system of claim 1, wherein the first and second shock absorber arms each comprise a spring-loaded shock absorber.

14. The bicycle balancing system of claim 1, wherein the first and second shock absorber arms each comprise hybrid shock absorbers.

15. A bicycle comprising a main bicycle body, front and rear wheels joined to the main bicycle body, and a balancing system attached to the bicycle, the balancing system comprising:
   (a) first and second wheels configured for positioning one on each side of the bicycle adjacent to the rear wheel;
   (b) first and second horizontal members each having a first end and a second end, wherein the first end of the first horizontal member is configured to couple to an axle of the first wheel, and the first end of the second horizontal member is configured to couple to an axle of the second wheel;
   (c) first and second vertical members each having an upper end and a lower end, wherein the lower end of the first vertical member is coupled to the first horizontal member at the second end thereof, and the lower end of the second vertical member is coupled to the second horizontal member at the second end thereof;
   (d) a horizontal balancing arm configured for rotatably mounting to the main bicycle body so that the balancing arm is perpendicular to the main bicycle body when in an upright position; the horizontal balancing arm having a first end rotatably coupled to the upper end of the first vertical member, and having a second end rotatably coupled to the upper end of the second vertical member;
   (e) first and second shock absorber arms each having a first end and a second end, wherein the first end of the first shock absorber arm is slidably mounted to the first vertical member and the first end of the second shock absorber arm is slidably mounted to the second vertical member, and the second ends of the first and second shock absorber arms are configured for coupling to the main bicycle body.

16. The bicycle of claim 15, further comprising an enclosure surrounding at least a portion of the bicycle to protect the driver from weather.

17. The bicycle of claim 16, wherein the enclosure surrounds all of the main bicycle body.

* * * * *